UNITED STATES PATENT OFFICE.

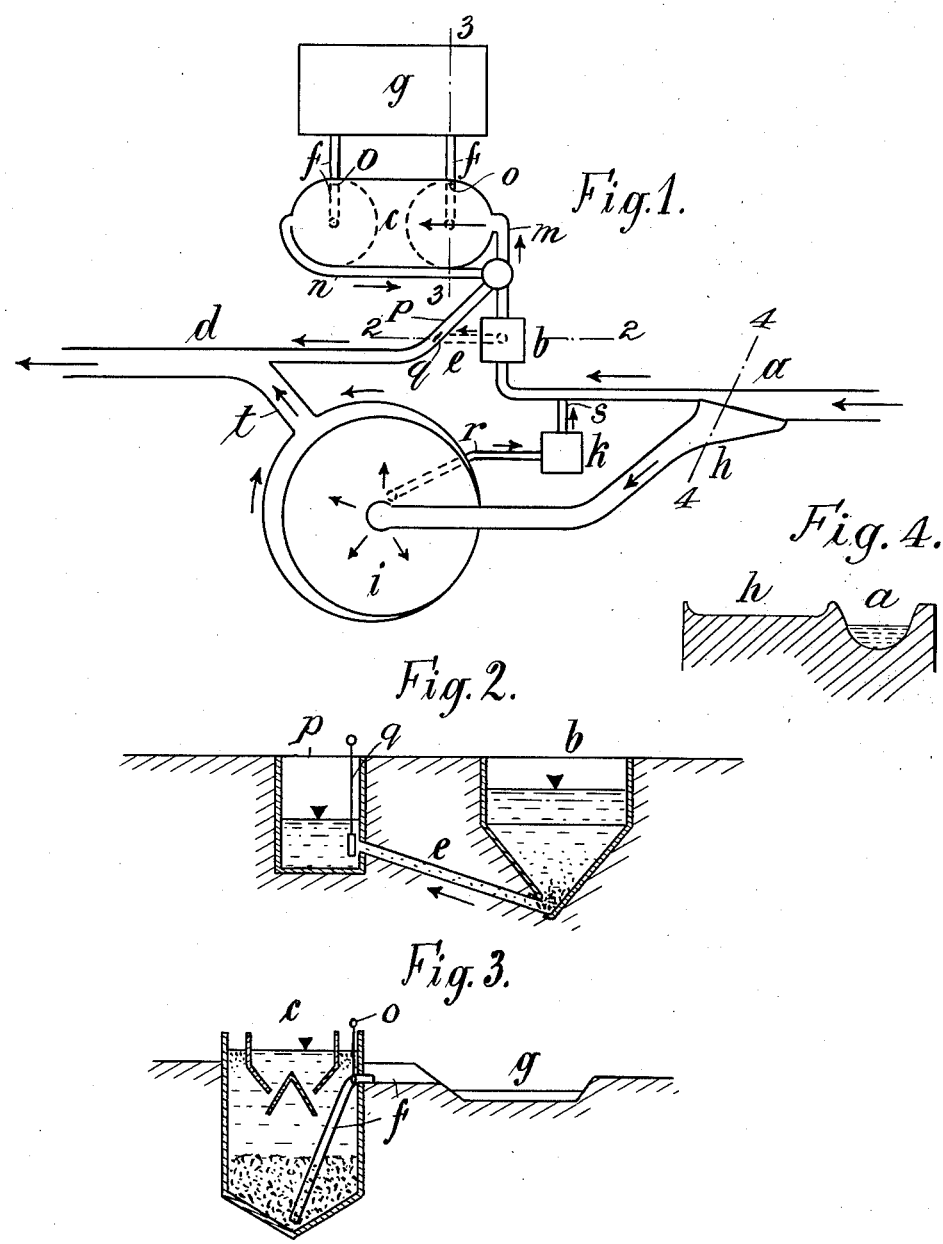

CARL IMHOFF, OF ESSEN-ON-THE-RUHR, GERMANY.

SEWAGE PURIFICATION.

1,053,396. Specification of Letters Patent. Patented Feb. 18, 1913.

Application filed December 26, 1911. Serial No. 667,659.

*To all whom it may concern:*

Be it known that I, CARL IMHOFF, a subject of the Emperor of Germany, residing at Essen-on-the-Ruhr, in the Province of Rhenish Prussia and Kingdom of Prussia, Germany, have invented certain new and useful Improvements in Sewage Purification, of which the following is a specification.

This invention relates to the purification of sewage and its novelty consists in the several successive steps of the treatment employed and in the construction and adaptation of the parts of the specific apparatus used in such treatment.

In the drawings, Figure 1 is a plan view somewhat in diagram of a structure in which my invention can be carried out; Fig. 2 is a vertical section on the plane of the line 2—2 in Fig. 1; Fig. 3 is a vertical section on the plane of the line 3—3 in Fig. 1; and Fig. 4 is a vertical section on the plane of the line 4—4 in Fig. 1.

In the drawings, $a$ is an inlet conduit leading to the purification system from the source of supply of the sewage (not shown). This conduit is preferably of a sufficient depth or capacity to accommodate the flow in dry weather and when practically all of the rain water is excluded therefrom. This conduit leads into a grit chamber indicated at $b$. The purpose of the grit chamber is to provide a receptacle in which the grit in suspension in the water will subside by gravity and collect at the bottom but so arranged that the organic matter in suspension in the water will be prevented from such subsidence. The principles governing the size and proportions of such a grit chamber with relation to the size of the plant and the amount of sewage delivered to the system, are understood by sanitary engineers and others skilled in the art to which this invention relates, and in any particular application of the invention the grit chamber must be constructed according to such principles.

Two conduits $m$ and $n$ connect the grit chamber to a settling tank indicated at $c$. This settling tank is preferably of the form described and claimed in Letters Patent of the United States No. 924,664 issued to me June 15, 1909, and is of the type known as a double decked tank. Its purpose is to provide a suitable receptacle in which the sludge will be deposited by gravity and in which it will decompose under water.

From the bottom of the settling tank $c$, one or more suitable pipes $f$ lead to a sludge-drying bed indicated at $g$. Each pipe $f$ is preferably provided with a valve or gate $o$ at any suitable place.

A lateral conduit $p$ which connects with the conduits $m$ and $n$ leads toward and into a general outflow conduit $d$. A pipe $e$ leads from the bottom of the grit chamber $b$ to near the bottom of this conduit $p$, and a valve $q$ is provided which controls its discharge orifice.

A storm water basin of suitable size and proportions is indicated at $i$. An overflow conduit $h$ leads from the inlet conduit $e$ to this basin. A pump $k$ is connected to the bottom of the storm water basin by a pipe $r$ and to the main inlet conduit $a$ by a second pipe $s$. This is for the purpose of conveying sludge from the basin to the grit chamber. A conduit $t$ also leads from the storm water basin to the main outlet conduit $d$.

It will be understood that all of the described parts are to be constructed of suitable size and material and located with respect to the source of the sewage and its disposal after purification according to the principles of sanitary engineering.

The manner of treating the sewage will now be described: If the dry weather flow only is to be taken care of, it approaches the apparatus through the conduit $a$ and passes into the grit chamber $b$. In this chamber the grit or inorganic matter in suspension in the water is allowed to subside by gravity. Some organic matter or sludge will also be deposited with the grit if the size of the chamber will permit, but it is intended that usually the sludge will pass over to the settling chamber $c$, where it will be deposited and allowed to decompose under water as explained in the Letters Patent above referred to. After the sludge has been deposited it is caused to pass through the conduits f f to the sludge-drying basin q. The grit can be removed from the grit chamber in any desired manner, but my invention provides for its easy automatic removal when its character is such that it will not be a harmful addition to the stream into which the outflow conduit leads. To that end the valve q leading to the pipe p (or directly to the outflow conduit d) is opened and a limited amount of water will then flow from the grit chamber to the outlet conduit and carry the grit with it. Of course, it may under some circumstances be desirable to utilize the collected grit for surfacing the sludge-drying bed or the like, but when no such use is contemplated the method described forms an easy and economical way of disposing of the grit. If the wet weather flow is also to be taken care of, the excess of water comes from the inlet conduit a through the overflow pipe h into the storm water basin i while, of course, the usual amount of the dry weather flow passes into the grit chamber b and thence into the settling tank c as before. In the storm water basin the grit and sludge are retained but the large bulk of water in which they have been suspended is allowed to pass on through the pipe t to the outlet conduit d. In other words, the purpose of this basin is to secure a concentration of the grit and sludge in the wet weather flow. When a quantity of sludge and grit has collected in the storm water basin, the pipes r and s are opened up to provide a free passage to and from the pump k, and the latter being operated the sludge and grit are conveyed to the conduit d and thence to the grit tank b and settling tank c, and are treated there just as the grit and sludge delivered to these tanks in the dry weather flow are treated. This method is especially applicable to the treatment of dilute sewage and in any case provides means for taking care of a relatively large quantity of incoming sewage with grit tanks and settling tanks of small size.

The advantages of practising this invention are important. When the grit is not harmful in character, it is removed from the grit chamber to the outflow conduit without expense or trouble. No special means for treating the grit or sludge deposited in the storm water basin is needed as it is cared for in common with that carried by the dry weather conduit, and in spite of the variable and sometimes large quantities of storm water which may enter the apparatus, much larger settling tanks need not be provided because in times of increased flow the grit tank and settling tank receive more grit and sludge but little more water than when treating only the dry weather flow. The removal of the grit from the grit chamber by the means provided is of especial value in treating storm water because this water, due to the washing of the surface of the ground by violent rains, always contains large amounts of grit which, unless removed, will subsequently retard the proper treatment of the sludge whether it be by treatment in a settling tank by decomposition, by burning or otherwise; and, as stated above, a storm water basin used as described is especially valuable in the treatment of dilute sewage.

What I claim as new is:

1. The process of treating sewage to effect its purification, which consists in conducting a predetermined quantity of sewage to a predetermined place, and separating the grit and sludge therefrom, conducting any over-supply of sewage to a different place, separating a material part of the liquid from said over-supply at said latter place and afterward removing the grit and sludge from the remainder of said over-supply.

2. The process of treating sewage to effect its purification, which consists in conducting a predetermined quantity of sewage to a predetermined place and separating the grit and sludge therefrom, conducting any over-supply to a different place and separating a material part of the liquid therefrom at said latter place, then conducting the remainder to the first-mentioned separating place and removing the grit and sludge from said remainder.

3. The process of treating sewage to effect its purification, which consists in conducting a predetermined quantity of sewage to a predetermined point and separating the grit therefrom, conducting the remainder of such predetermined quantity to a different point and removing the sludge therefrom, conducting any over-supply of sewage to a different point and separating a material part of the water therefrom, then conducting the remainder of the over-supply to the first-mentioned separating point, removing the grit at such point, and finally conducting the remainder of the over-supply to the first-mentioned sludge-separating point and removing the sludge therefrom.

4. The process of treating sewage which consists in conducting a portion thereof to a grit chamber where the grit therein may subside by gravity and thence to a settling tank where the sludge is removed and thence to an outflow conduit, and conducting another portion thereof to a stormwater basin wherein the materials heavier than water may settle and thence delivering the settlings to the grit chamber.

5. The process of treating sewage which consists in conducting the same to a stormwater basin wherein the grit and sludge are concentrated, conveying the concentrate to a grit chamber and automatically discharging from the grit chamber the grit deposited therein.

6. The process of treating sewage which consists in conducting the same to a storm-water basin wherein the grit and sludge are concentrated, conveying the concentrate to a grit chamber and thence to a settling tank and automatically discharging from the grit chamber the grit deposited therein.

In testimony whereof I affix my signature in presence of two witnesses.

CARL IMHOFF. [L. S.]

Witnesses:
ALBERT NUFER,
HELEN NUFER.